No. 844,376. PATENTED FEB. 19, 1907.
W. W. MACFARREN.
SAFETY DEVICE FOR CAR HAULS.
APPLICATION FILED MAY 3, 1906.
2 SHEETS—SHEET 1.
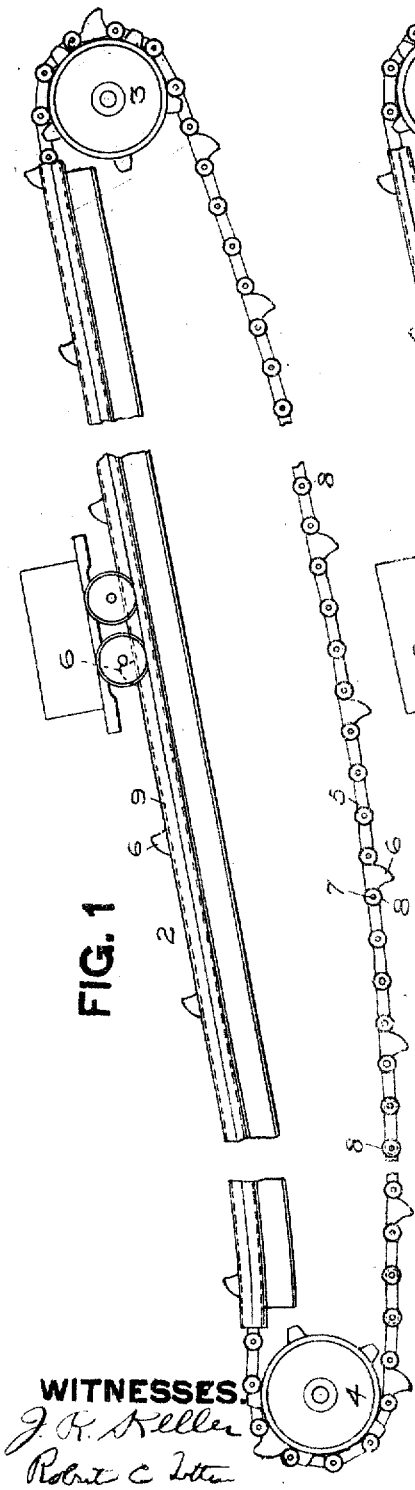
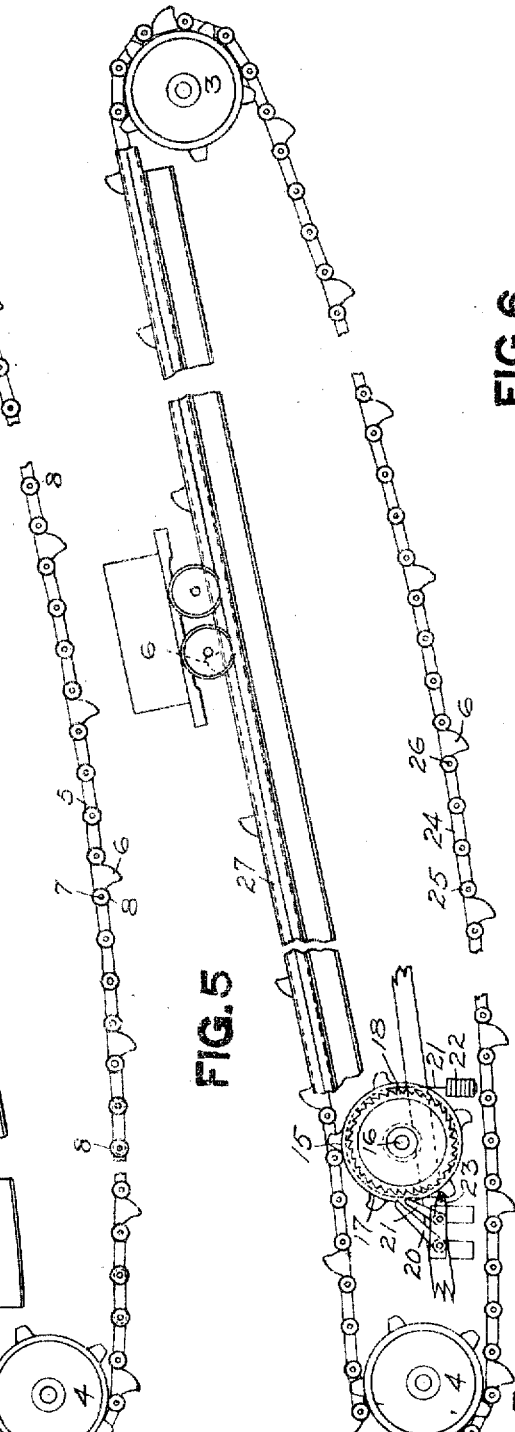
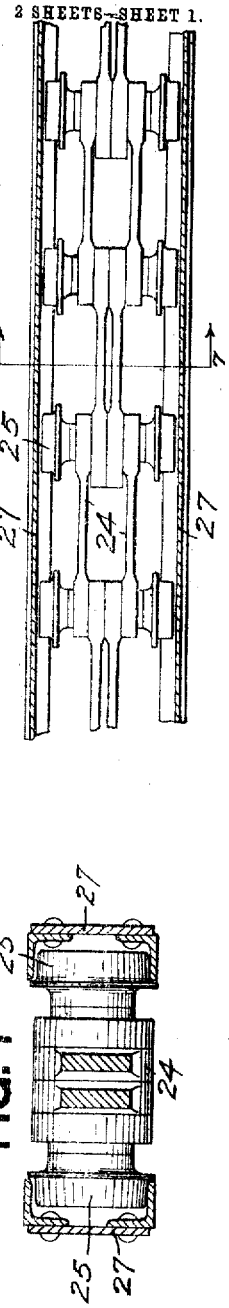
WITNESSES.
INVENTOR.

No. 844,376. PATENTED FEB. 19, 1907.
W. W. MACFARREN.
SAFETY DEVICE FOR CAR HAULS.
APPLICATION FILED MAY 3, 1906.

2 SHEETS—SHEET 2.

WITNESSES.

INVENTOR.

UNITED STATES PATENT OFFICE.

WALTER W. MACFARREN, OF PITTSBURG, PENNSYLVANIA.

SAFETY DEVICE FOR CAR-HAULS.

No. 844,376.	Specification of Letters Patent.	Patented Feb. 19, 1907.

Application filed May 3, 1906. Serial No. 315,117.

*To all whom it may concern:*

Be it known that I, WALTER W. MACFARREN, a resident of Pittsburg, in the county of Allegheny and State of Pennsylvania, have invented a new and useful Improvement in Safety Device for Car-Haul; and I do hereby declare the following to be a full, clear, and exact description thereof.

My invention relates to a safety device for car-hauls, its object being to provide a simple and inexpensive device of this character which will act instantaneously in case of the breakage of the chain, while at the same time the buckling of the chain is prevented throughout its length, thereby relieving the strain on the chain and greatly reducing the amount of damage in case of the parting of the chain at any point when loaded with cars.

To these ends my invention comprises the novel features hereinafter set forth and claimed.

Figure 2:
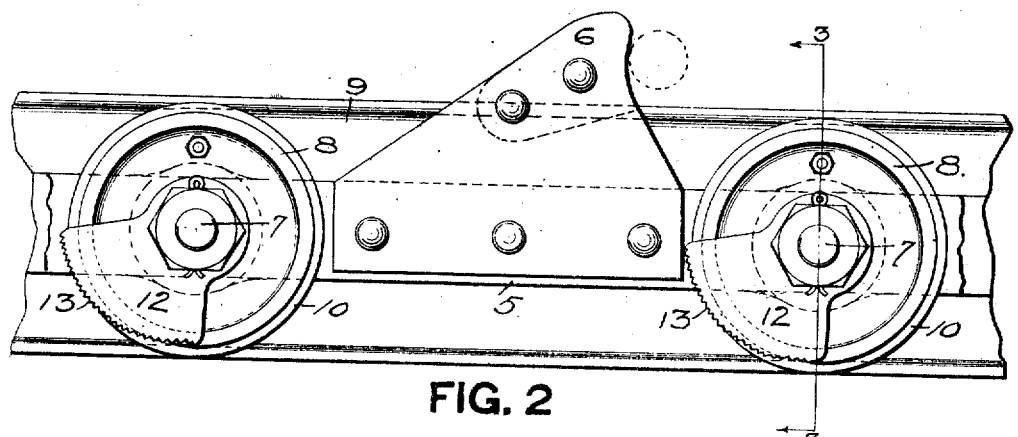
Figure 3:
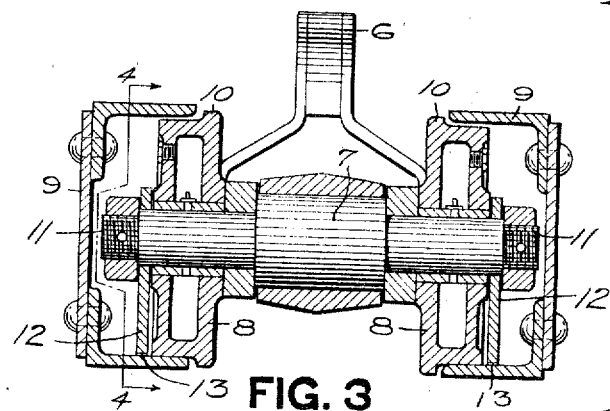
Figure 4:
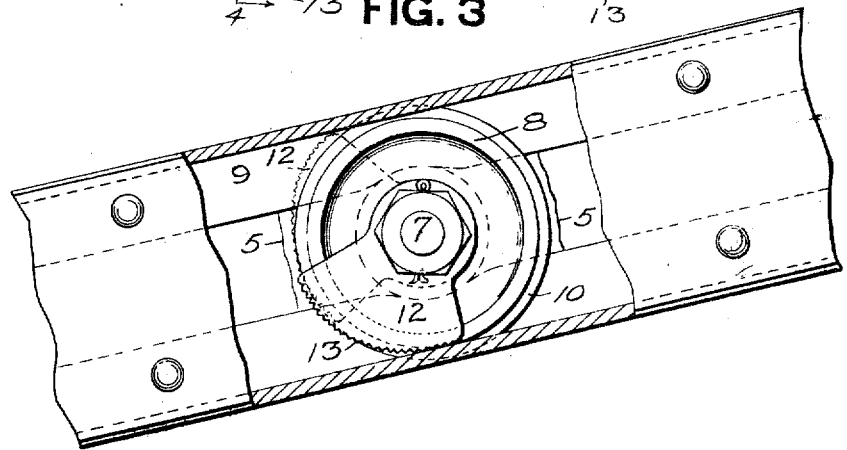

In the accompanying drawings, Figure 1 is a side view of an ordinary car-haul of the character to which my invention is applicable. Fig. 2 is an enlarged view of a portion of the chain, showing one form of safety device as applied thereto. Fig. 3 is a cross-section on the line 3 3, Fig. 2. Fig. 4 is a view showing the safety device in action. Fig. 5 is a side view of a car-haul, showing a modified form of my invention. Fig. 6 is an enlarged plan view of a portion of the chain and the conduit in the modified form of my invention; and Fig. 7 is a cross-section on the line 7 7, Fig. 6.

Like numerals indicate like parts.

In the drawings the numeral 2 designates a suitable car-haul, which is mounted and driven in the ordinary way by the sprocket-wheels 3 and 4 at the upper and lower ends thereof, one of said sprocket-wheels being connected with a suitable engine.

The chain 5 is composed of links connected in the ordinary manner, and at intervals said chain is provided with the horns or projections 6, which are adapted to engage the axle or other part of the car and propel it up the incline of the haul. Secured at suitable intervals to the chain are the pins 7, which form axles carrying the wheels 8, which are adapted to travel in the conduit 9. This conduit 9 extends substantially from the bottom to the top of the haul and may be formed of angle-irons connected together in any suitable manner. The wheels 8 travel within the conduit 9, and the flanges 10 on said wheels, together with the ends 11 of the pins 7, guide the wheels and prevent their disengagement from the conduit, there being a slight endwise as well as vertical play within the conduit.

Loosely mounted on the pin 7 are the safety stops or cams 12, which are preferably serrated on their circular edges, as at 13.

Under ordinary circumstances in the operation of the car-haul the chain carries the cars to the top of the haul, where the cars are released, and the chain then passes with the horns or projections 6 in an inverted position down to the lower end of the haul. The upgoing cars are engaged by the horns or projections 6, and the loaded cars are in this way carried up the incline, the wheels 8 traveling on the lower flanges of the conduit 9, said wheels having, as stated, a certain amount of play between the upper and lower flanges of said conduit. If, however, the chain should break or part at any point in its ascent, the revolution of the wheels 8 is reversed, and immediately the cams 12 are wedged or forced into the position shown in Fig. 4, where they act to arrest the descent of the chain and hold it securely at different points throughout its length, so that there is no opportunity for any further slipping or sliding of the chain in the conduit. The chain when thus arrested prevents the cars engaged at different points from running to the bottom of the haul and causing great damage and destruction of property.

While the action of the cams is very quick and positive, at the same time, as the stoppage is due to the frictional contact of the cams with the lower-flange of the conduit, a certain amount of slipping or spring is allowed, thus reducing the shock to the structure. The stops or cams being located at intervals throughout the length of the chain act at such points, and the strain is not all located at one point, which is the case in some devices of this character.

In case the cams should become gummed or stick for any reason when the chain breaks, they will be carried to the position indicated in dotted lines, Fig. 4, and engage the upper flange of the conduit. In no case, however, can the cams make a complete revolution in the conduit in case they stick, and as a consequence they are always in position to act.

In Fig. 5 I have illustrated a modified form of my invention in which a safety-stop 15 is permanently located at the bottom of the haul. This safety-stop in this instance comprises a shaft 16, having a sprocket-wheel 17 thereon, and with the circular ratchet 18, which is engaged by pawls 19 and 20 and brake-band 21, carrying a weight 22. The pawl 19 is mounted on the swinging arm 23 just in front of and in line with the pawl 20, and the brake-band 21 being connected with the arm 23 the pawls are normally held out of engagement with the ratchet by the weight 22. The chain 24 of the haul is provided with the wheels or rollers 25 on each pin 26, which connect the links of the chain, and these wheels travel in the conduit 27. In the operation of this modified form of my invention if the chain breaks at any point above the safety-stop 15 the sprocket-wheel 17 will be engaged by one of the pins 26 and the pawls 19 and 20 will be thrown into engagement with the ratchet 18, so as to prevent the further rotation of the sprocket-wheel in that direction, and thus arrest the downward movement of the chain. The rollers 25 on the chain in case of breakage of the chain at any point will, below the point of breakage, so engage the top and bottom flanges of the conduit 27 as to prevent the buckling or sliding of the chain, and the chain would sustain the compression. In this form of my invention by means of a single permanent safety-stop at the bottom of the haul or at any other suitable point the chain is held from buckling owing to its traveling in the conduit, and as a consequence further slipping or sliding of the chain is prevented by the engagement of the rollers with the said conduit.

By my invention I provide a safety appliance of this character which is positive in its action and in which the strain is distributed throughout the length of the chain, while at the same time the device is of such simple character that its cost of construction is low, and it is a very simple matter in case of repair to remove one of the cams and apply a new one.

What I claim is—

1. In a car-haul, the combination of a chain, a conduit, said chain traveling in said conduit, and mechanism carried by said chain and acting on said conduit for restraining said chain in case of a break.

2. In a car-haul, the combination of a stationary support, a chain, a series of safety devices carried at intervals by said chain, and adapted to be thrown into restraining engagement with said support at substantially the same time when said chain breaks.

3. In a car-haul, the combination of a chain, a conduit, rollers on said chain engaging said conduit, and means carried by said chain to engage said conduit to restrain said chain against backward movement in case of a break.

4. In a car-haul, the combination of a chain, rollers on said chain traveling on a suitable track or support, and a safety device carried by said chain adapted to engage said track or support.

5. In a car-haul, the combination of a chain, rollers on said chain traveling on a suitable track or support, and a safety device on the axle of the roller adapted to engage said track or support.

6. In a car-haul, the combination of a chain, rollers on said chain traveling on a suitable track or support, and a cam on the axle of the roller adapted to engage said track or support.

7. In a car-haul, the combination of a chain, rollers at intervals on said chain traveling on a suitable track or support, and cams on the roller-axles adapted to engage said track or support.

8. In a car-haul, the combination of a chain, rollers at intervals on said chain traveling on a suitable track or support, and loosely-mounted cams on the roller-axles adapted to engage said track or support.

9. In a car-haul, the combination of a chain, rollers at intervals on said chain traveling on a suitable track or support, and a loosely-mounted cam on the axle of said roller, said cam having teeth adapted to engage said track or support.

10. In a car-haul, the combination of a chain, a conduit, rollers on said chain traveling in said conduit, and one or more loosely-mounted cams on the roller-axles adapted to engage said conduit.

11. In a car-haul, a chain, a conduit, said chain traveling in said conduit and guided thereby, and means for adapting said chain to resist a compressive force in the direction of its length whereby the backward movement of said chain is prevented.

In testimony whereof I, the said WALTER W. MACFARREN, have hereunto set my hand.

WALTER W. MACFARREN.

Witnesses:
ROBERT C. TOTTEN,
J. R. KELLER.